US012748706B2

(12) United States Patent
Choi et al.

(10) Patent No.: US 12,748,706 B2
(45) Date of Patent: Sep. 29, 2026

(54) COMPUTING DEVICE THAT EXECUTES ADDRESS TRANSLATION FOR STORAGE DEVICE, COMPUTING SYSTEM AND OPERATING METHOD THEREOF

(71) Applicant: SK hynix Inc., Gyeonggi-do (KR)

(72) Inventors: Soo Kyung Choi, Gyeonggi-do (KR); Jae Yung Jun, Gyeonggi-do (KR); Kwang Sik Shin, Gyeonggi-do (KR); Se Eun Oh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 5 days.

(21) Appl. No.: 18/740,521

(22) Filed: Jun. 12, 2024

(65) Prior Publication Data

US 2025/0252059 A1 Aug. 7, 2025

(30) Foreign Application Priority Data

Feb. 5, 2024 (KR) ........................ 10-2024-0017133

(51) Int. Cl.
*G06F 12/1009* (2016.01)

(52) U.S. Cl.
CPC .. *G06F 12/1009* (2013.01); *G06F 2212/7203* (2013.01)

(58) Field of Classification Search
CPC ..................... G06F 12/1009; G06F 2212/7203
See application file for complete search history.

(56) References Cited

U.S. PATENT DOCUMENTS

| | | | | |
|---|---|---|---|---|
| 5,446,854 | A | 8/1995 | Khalidi et al. | |
| 2011/0219208 | A1 | 9/2011 | Asaad et al. | |
| 2021/0019069 | A1* | 1/2021 | Sen | G06F 12/122 |
| 2022/0245067 | A1* | 8/2022 | Liu | G06F 12/1009 |
| 2023/0251989 | A1* | 8/2023 | Mazumdar | G06F 13/382 710/313 |
| 2023/0297527 | A1 | 9/2023 | Turlik et al. | |

FOREIGN PATENT DOCUMENTS

KR 10-2013-0048206 A 5/2013

OTHER PUBLICATIONS

Partial European Search Report for European Patent Application No. 24196377.6 issued by the European Patent Office on Mar. 11, 2025.

* cited by examiner

*Primary Examiner* — Eric Cardwell
(74) *Attorney, Agent, or Firm* — IP&T GROUP LLP

(57) ABSTRACT

A computing device may search for a plurality of first physical addresses that are start physical addresses corresponding to a plurality of first virtual addresses from a page table based on a first start virtual address that is a start address of a virtual address space including the plurality of first virtual addresses corresponding to a plurality of first pages for a first storage device, and transmit a first access request for at least one first physical address of the plurality of first physical addresses to the first storage device using a first storage controller.

8 Claims, 10 Drawing Sheets

COMPUTING DEVICE THAT EXECUTES ADDRESS TRANSLATION FOR STORAGE DEVICE, COMPUTING SYSTEM AND OPERATING METHOD THEREOF

CROSS-REFERENCES TO RELATED APPLICATION

The present application claims priority under 35 U.S.C. 119(a) to Korean patent application number 10-2024-0017133 filed on Feb. 5, 2024, which is incorporated herein by reference in its entirety.

BACKGROUND

1. Technical Field

Various embodiments of the present disclosure generally relate to a computing device that executes address translation for a storage device, a computing system and operating method thereof.

2. Related Art

A computing device may access a storage device located inside or outside the computing device. To do this, the computing device needs to translate a virtual address (it may be referred as logical address) used by the computing device into a physical address of the storage device.

Generally, when the computing device translates (or converts) a virtual address to a physical address, translation (or conversion) is performed in a unit of a fixed size (e.g. 4 KB) regardless of the page size corresponding to the storage device. Therefore, the number of addresses that the computing device translates during address translation process is determined by the data size regardless of the page size.

SUMMARY

Various embodiments of the present disclosure are directed to provide a computing device capable of executing address translation efficiently according to page size corresponding to a storage device, a computing system, and operating method thereof.

In an embodiment of the present disclosure, a computing device may include a first storage controller configured to communicate through a first interface with a first storage device which is located external to the computing device, uses a virtual address system corresponding to the computing device, and is separated into a plurality of first pages corresponding to a plurality of first virtual addresses respectively; a memory configured to store a page table including mapping information between the plurality of first virtual addresses and physical addresses of the plurality of first pages corresponding to the plurality of first virtual addresses respectively; and a processor configured to search for a plurality of first physical addresses, which are start physical addresses corresponding to the plurality of first virtual addresses, from the page table based on a first start virtual address, which is a start address of a virtual address space including the plurality of first virtual addresses corresponding to the plurality of first pages of the first storage device, and control the first storage controller to transmit a first access request for at least one first physical address of the plurality of first physical addresses to the first storage device.

In an embodiment of the present disclosure, an operating method of a computing device may include determining a plurality of first pages corresponding to a first storage device which is located external to the computing device, uses a virtual address system corresponding to the computing device, and is separated into the plurality of first pages corresponding to a plurality of first virtual addresses respectively; searching for a plurality of first physical addresses, which are start physical addresses corresponding to a plurality of first virtual addresses, from a page table, which includes mapping information between the plurality of first virtual addresses and the physical address of the plurality of first pages corresponding to the plurality of first virtual addresses, based on a first start virtual address, which is a start address of a virtual address space including the plurality of first virtual addresses corresponding to the plurality of first pages; and transmitting a first access request for at least one first physical address of the plurality of first physical addresses to the first storage device through a first interface.

In an embodiment of the present disclosure, a computing system may include a computing device including a first data storage device including a plurality of first storage pages each having a first storage capacity and a processor controlling the first data storage device; and a second data storage device located outside the computing device and including a plurality of reference pages each having the first storage capacity and a plurality of second storage pages each having a second storage capacity. In this case, the processor may be configured to access a first storage page that requires access among the plurality of first storage pages of the first data storage device based on a physical address corresponding to the first storage page that requires access, and access a second storage page that requires access among the plurality of second storage pages of the second data storage device based on a physical address corresponding to a reference page with the highest physical address among the plurality of reference pages included in the second storage page that requires access.

According to embodiments of the present disclosure, it is possible to execute address translation efficiently according to page size corresponding to a storage device.

DETAIL DESCRIPTION

Figure 1:
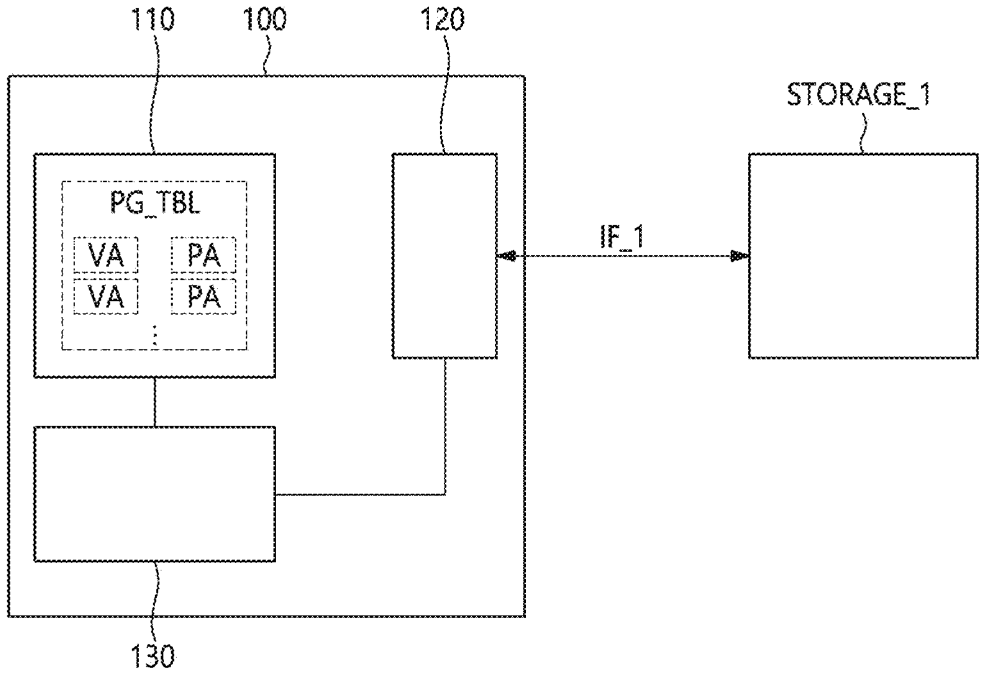
FIG. 1 is a diagram showing a configuration of a computing device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the embodiments of the present disclosure may be embodied in different forms and variations, and should not be construed as being limited to the embodiments set forth herein. Rather, the described embodiments are provided so that this disclosure will be thorough and complete, and will fully convey the scope of the present disclosure to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram showing a configuration of a computing device 100 according to an embodiment of the present disclosure.

Referring to FIG. 1, the computing device 100 may include a memory 110, a first storage controller 120 and a processor 130.

The memory 110 may store a page table PG_TBL indicating mapping information between a virtual address (or logical address) VA corresponding to a process of the computing device 100 and a physical address PA corresponding to the virtual address. The computing device 100 may translate a virtual address on the computing device 100 into a physical address corresponding to a device located inside or outside the computing device 100 through the page table PG_TBL.

The memory 110 may be a volatile memory including one or more of a static RAM (SRAM), a dynamic RAM (DRAM), and a synchronous DRAM (SDRAM), etc.

In order to indicate mapping information between a virtual address VA and a physical address PA, the page table PG_TBL may be implemented in various types of data structures. Hereinafter, this will be described in detail in FIG. 2.

The first storage controller 120 may communicate with a first storage device STORAGE_1 through a first interface IF_1. The first storage controller 120 may provide a communication standard or interface using at least one of various protocols such as USB (Universal Serial Bus) protocol, MMC (multimedia card) protocol, PCI (peripheral component interconnection) protocol, PCI-E (PCI-express) protocol, ATA (Advanced Technology Attachment) protocol, Serial-ATA protocol, Parallel-ATA protocol, SCSI (small computer small interface) protocol, ESDI (enhanced small disk interface) protocol, SMBus (System Management Bus) protocol, I2C (Inter-Integrated Circuit) protocol, I3C (Improved Inter-Integrated Circuit) protocol, and IDE (Integrated Drive Electronics) protocol, private protocol, etc.

For example, the first interface IF_1 may include a Compute express Link (CXL) interface.

The first storage device STORAGE_1 may be located external to the computing device 100, and use a virtual address system corresponding to the computing device 100.

The first storage device STORAGE_1 may be separated (partitioned) into a plurality of first pages corresponding to a plurality of first virtual addresses respectively. The page table PG_TBL may include mapping information between a plurality of first virtual addresses and physical addresses of a plurality of first pages corresponding to the plurality of first virtual addresses.

When the first storage device STORAGE_1 uses a virtual address system corresponding to the computing device 100, the first storage device STORAGE_1 and the computing device 100 may share the same virtual address space and use the same page table for address translation. Through this, the computing device 100 may access the first storage device STORAGE_1 in the same way as the memory 110 inside the computing device 100.

Since the address translation for the first storage device STORAGE_1 is performed through the page table stored in the computing device 100, the first storage device STORAGE_1 is different from the SSD device performing address translation using a separate page table. Hereinafter, this will be described in detail in FIG. 3.

The first storage device STORAGE_1 may be implemented in various ways.

For example, the first storage device STORAGE_1 may be CXL-based calculation memory device. The first storage device STORAGE_1 may include a processing core (not shown) capable of performing operations and a storage unit (not shown) capable of storing data.

As another example, the first storage device STORAGE_1 may be CXL-based accelerator device.

The processor 130 may search for a plurality of first physical addresses that are start physical addresses corresponding to the plurality of first virtual addresses from the page table PG_TBL based on a start virtual address of the plurality of first pages (now shown) for the first storage device STORAGE_1, that is, a first start virtual address which is a start address of a virtual address space including a plurality of first virtual addresses corresponding to the plurality of first pages (not shown).

At this time, each of the plurality of first pages may include a plurality of subpages. The first physical address corresponding to a specific first page may be the same as the physical address of highest subpage among subpages included in the first page.

For example, the processor 130 may search for two first physical addresses respectively corresponding to two pages in the page table PG_TBL based on start virtual addresses of two pages of 2 MB size and the total size of the two pages, which is 4 MB. In this case, each page may include 512 subpages with a size of 4 KB.

However, the processor 130 does not perform address translation on subpages. Hereinafter, this will be described in detail in FIG. 4.

Then, the processor 130 may transmit a first access request for at least one first physical address among the plurality of searched first physical addresses to the first storage device STORAGE_1. To this end, the processor 130 may control the first storage controller 120 to transmit the first access request to the first storage device STORAGE_1. Hereinafter, this will be described in detail in FIG. 5.

The processor 130 may perform logical calculations needed to perform the above-described operations. To this end, the processor 130 may execute (drive) an operating system (OS). The operating system may include binary data in which code for the processor 130 to execute the above-described operation is defined.

The above-described computing device 100 may be implemented in various ways. As an example, the computing device 100 may be a host. The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device capable of storing data.

Hereinafter, the specific structure and operation of the computing device 100 will be described.

Figure 2:
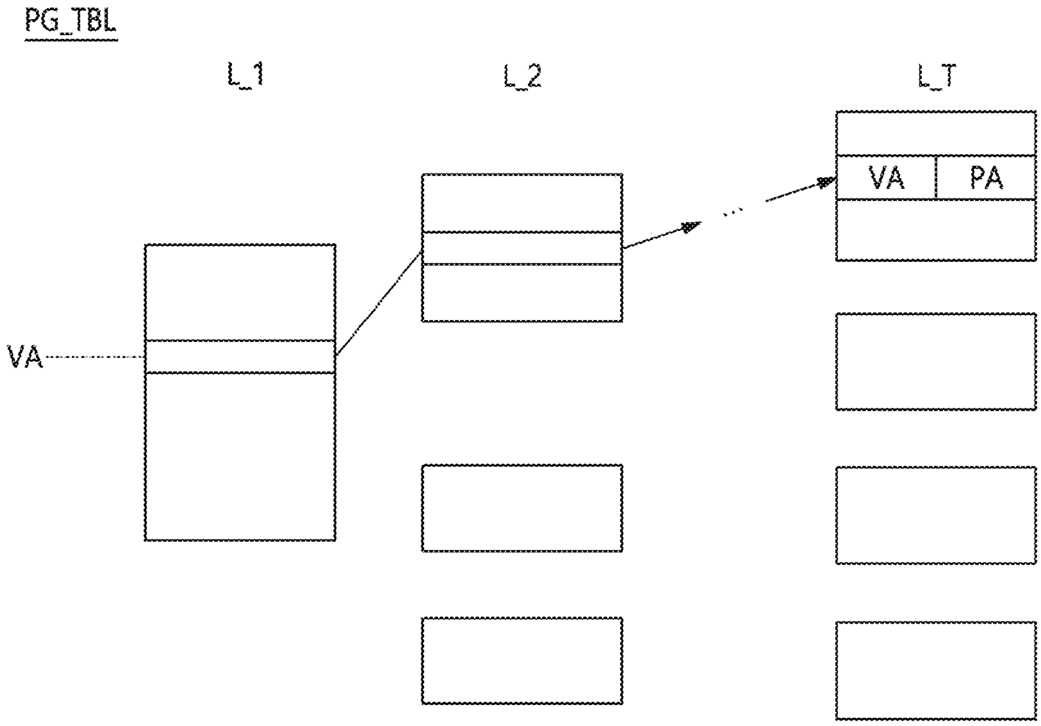
FIG. 2 is a diagram for describing of a page table according to an embodiment of the present disclosure.

FIG. 2 is a diagram showing a configuration of a page table PG_TBL according to an embodiment of the present disclosure.

Referring to FIG. 2, the page table PG_TBL may be composed of T layers, where T is a natural number, and one or more sub-tables may exist for each layer.

The processor 130 described in FIG. 1 may operate as follows to search for a physical address for a specific virtual address VA.

The processor 130 may search for a table entry corresponding to a virtual address space including the virtual address VA in a subtable existing in the first layer L_1. The searched table entry may indicate a subtable corresponding to a virtual address space including a virtual address VA among subtables existing in the second layer L_2. The processor 130 may search in the same manner in the subtables on the second layer L_2 indicated by the searched table entry.

By repeating this process, the processor 130 may search for a sub-table that stores a physical address PA mapped to a virtual address VA among subtables existing in the T layer (L_T) and confirm that the physical address PA is mapped to the virtual address VA.

Figure 3:
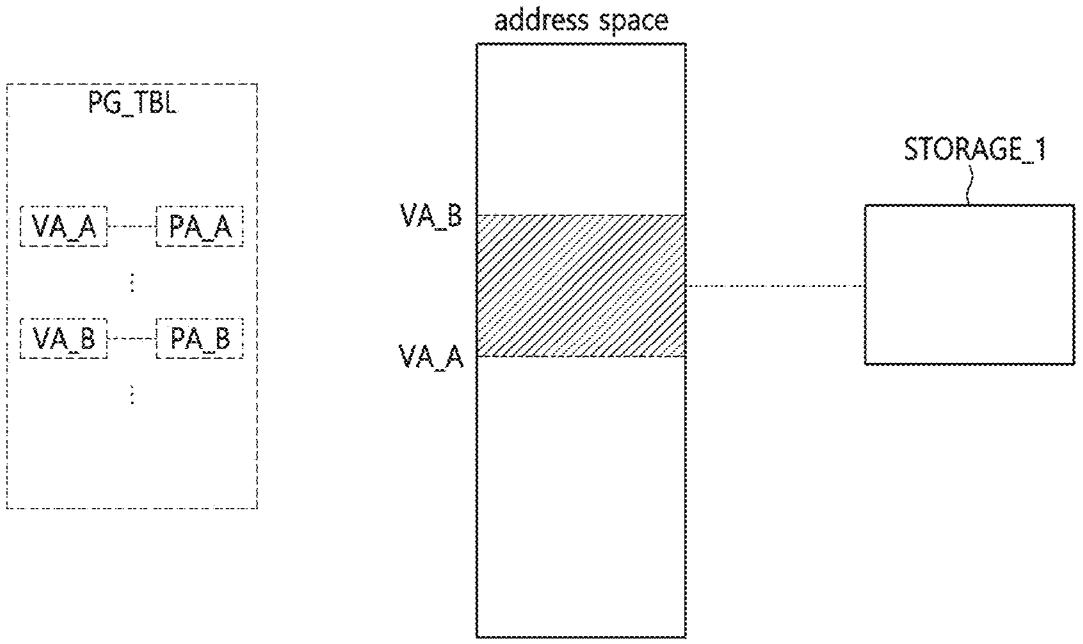
FIG. 3 is a diagram for describing an address space of the computing device according to an embodiment of the present disclosure.

FIG. 3 is a diagram for describing an address space of the computing device 100 according to an embodiment of the present disclosure.

In FIG. 3, the virtual address space between the virtual address VA_A and the virtual address VA_B in the address space of the computing device 100 may be mapped to the first storage device STORAGE_1.

In order to obtain the physical address of the first storage device STORAGE_1, the computing device 100 may search for a physical address mapped to a virtual address between the virtual address VA_A and the virtual address VA_B in the page table PG_TBL of the computing device 100.

Figure 4:
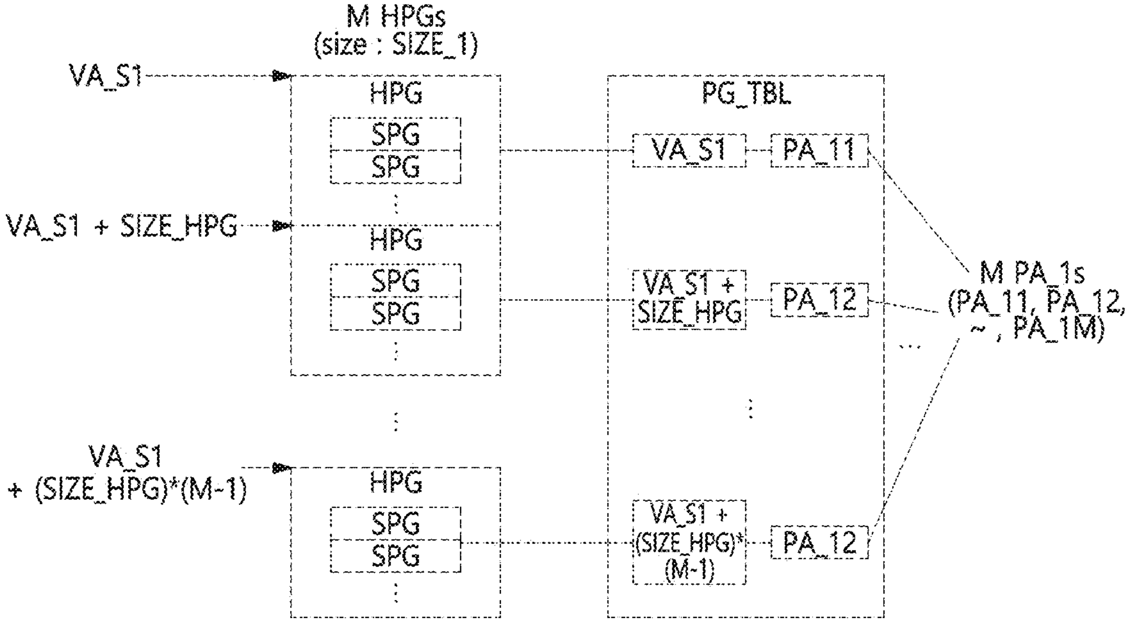
FIG. 4 is a diagram for describing an operation in which the computing device searches for a plurality of first physical addresses according to an embodiment of the present disclosure.

FIG. 4 is a diagram for describing an operation in which the computing device 100 searches for a plurality of first physical addresses PA_1*s* according to an embodiment of the present disclosure.

Referring to FIG. 4, the processor 130 of the computing device 100 may search for M first physical addresses PA_1*s* about M first pages HPG, where M is a natural number of 2 or more, corresponding to the first storage device STORAGE_1.

Given a first start virtual address VA_S1, which is a start address of a virtual address space including a plurality of first virtual addresses corresponding to M first pages HPG, the processor 130 may determine M first virtual addresses respectively corresponding to the M first pages HPG. Since the size SIZE_HPG of each first page is predetermined, the processor 130 may perform an operation to determine a virtual address corresponding to each of the M first pages HPG based on the size.

The processor 130 may additionally use first size SIZE_1, which is sum of the sizes of M first pages HPG, to determine the M first virtual addresses.

In FIG. 4, the M virtual addresses corresponding to the M first pages HPG are VA_S1, VA_S1+SIZE_HPG, ~, VA_S1+(SIZE_HPG)*(M−1).

The processor 130 may search for M first physical addresses, which are start physical addresses respectively corresponding to the determined M first virtual addresses, in the page table PG_TBL. The processor 130 may search the M first physical addresses PA_11, PA_12, ~, PA_1M in the page table PG_TBL.

At this time, the processor 130 does not perform address translation on subpages SPG included in each of the M first pages HPG. This is because the first storage device STORAGE_1 is accessed in units of first pages HPG, so there is no need to perform address translation on the subpages SPGS included in the first page HPG. Instead, when address translation for the subpages SPG is performed, the resources used for address translation increase rapidly, and an additional operation should be performed to select necessary physical addresses after the address translation.

Therefore, the processor 130 may perform address translation more efficiently by not performing unnecessary address translation on the subpages SPG when performing address translation on the M first pages HPG.

The processor 130 may store the searched M first physical addresses PA_1*s* in a specific location.

For example, the processor 130 may store the above-described M first physical addresses PA_1*s* in a preset first data buffer (not shown).

The first data buffer may store a plurality of physical addresses. The first data buffer may be included within the computing device 100 and may be located internally or externally to the processor 130. At this time, the processor 130 does not store physical addresses corresponding to subpages included in the M first pages HPG in the first data buffer.

Figure 5:
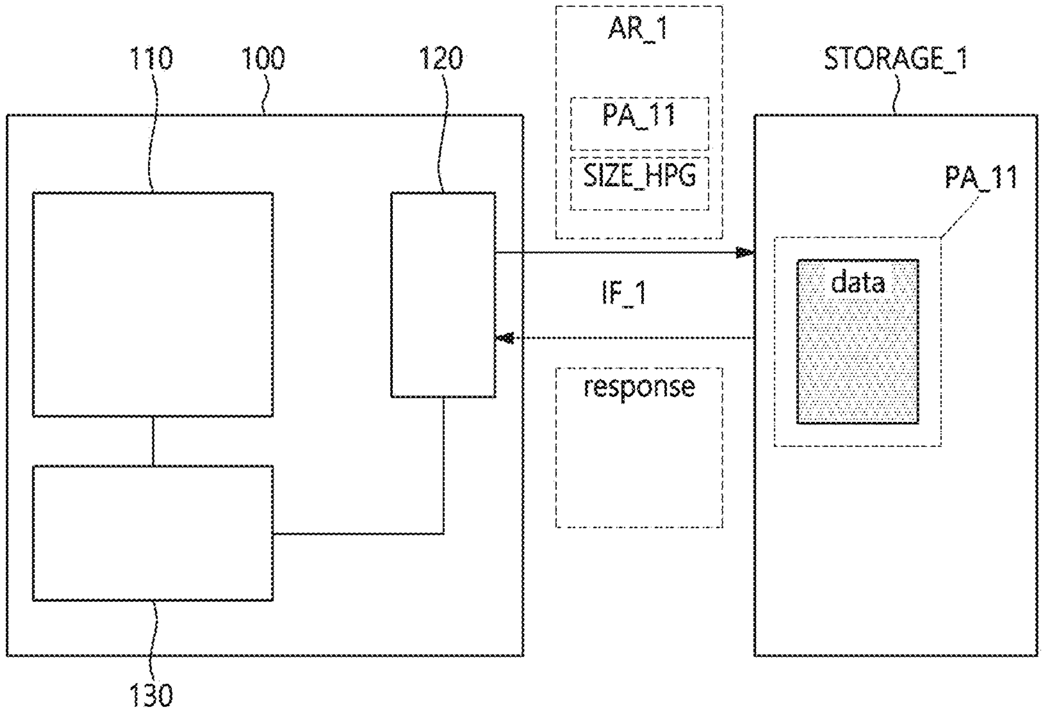
FIG. 5 is a diagram for describing an operation in which the computing device transmits a first access request to a first storage device according to an embodiment of the present disclosure.

FIG. 5 is a diagram for describing an operation in which the computing device 100 transmits a first access request AR_1 to a first storage device STORAGE_1 according to an embodiment of the present disclosure.

Referring to FIG. 5, the processor 130 of the computing device 100 may transmit first access request AR_1 to the first storage device STORAGE_1 through first interface IF_1 using a first storage controller 120.

For example, the first access request AR_1 may be a read request or a write request.

At this time, the first access request AR_1 may include at least one first physical address among the above-mentioned M first physical addresses PA_11, PA_12, ~, PA_1M, and may include the size SIZE_HPG of the first page corresponding to the first access request AR_1 among the M first pages HPG. In FIG. 5, the first access request AR_1 includes a first physical address PA_11.

The first access request AR_1 may include the total size of the area to be accessed by the first storage device STORAGE_1. For example, if the first access request AR_1 includes K of the M first physical addresses PA_11, PA_12, ~, PA_1M, the first access request AR_1 may include K*(SIZE_HPG), which is the size of the K first pages HPG.

The first storage device STORAGE_1 may receive the first access request AR_1 and access the area indicated by the first physical address PA_11 included in the first access request AR_1. When the first access request AR_1 is a read request, the first storage device STORAGE_1 may read data of size SIZE_HPG stored in the area indicated by the first physical address PA_11 by a unit of SIZE_HPG. When the first access request AR_1 is a write request, the first storage device STORAGE_1 may write data of size SIZE_HPG in the area indicated by the first physical address PA_11.

The first storage device STORAGE_1 may transmit a response corresponding to the first access request AR_1 to the computing device 100. When the first access request AR_1 is a read request, the response may include read data. When the first access request AR_1 is a write request, the response may indicate whether write operation was successful or failed.

Figure 6:
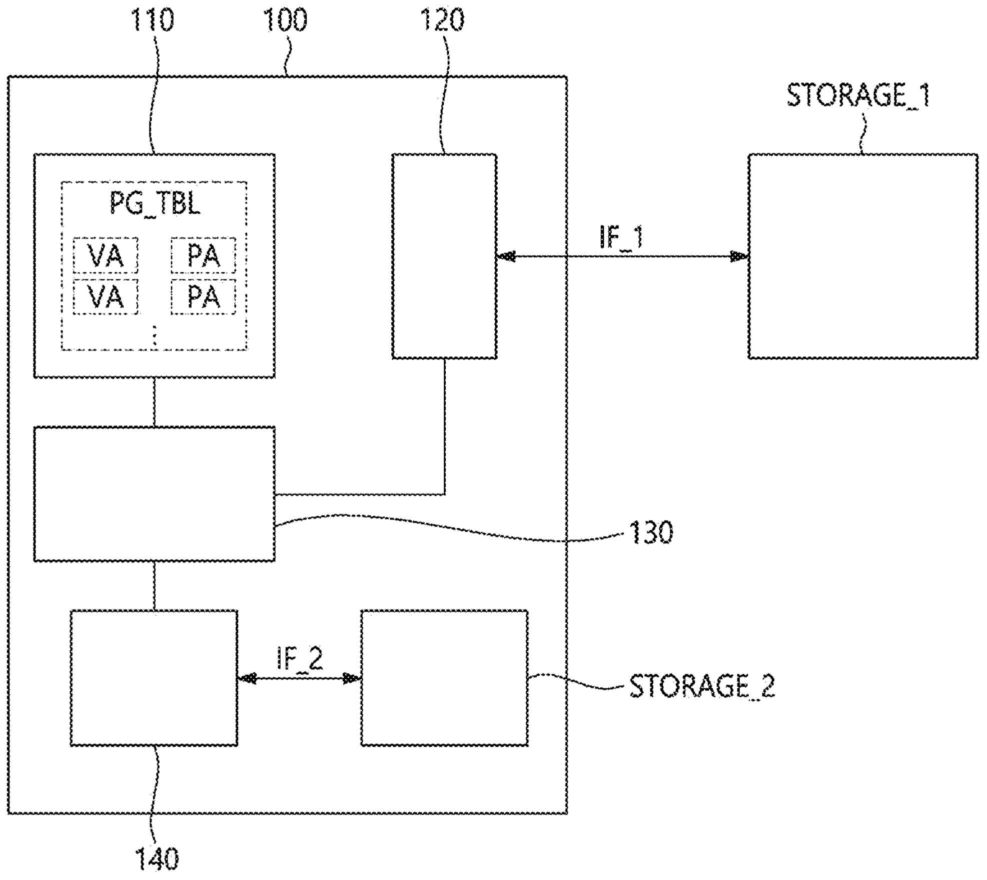
FIG. 6 is a diagram showing a configuration of a computing device according to an embodiment of the present disclosure.

FIG. 6 is a diagram showing a configuration of a computing device 100 according to an embodiment of the present disclosure.

Referring to FIG. 6, the computing device 100 may additionally include, in addition to the memory 110, the first storage controller 120, and the processor 130 described above, a second storage controller 140 and a second storage device STORAGE_2.

The second storage device STORAGE_2 may use the virtual address system corresponding to the computing device 100 and may be separated into a plurality of second pages corresponding to a plurality of second virtual addresses respectively. The second storage controller 140 may communicate with the second storage device STORAGE_2 through a second interface IF_2. For example, the second interface IF_2 may include a PCI Express (PCIe) interface or a system bus (not shown) inside the computing device 100.

The second storage device STORAGE_2 may also be implemented in various ways.

For example, the second storage device STORAGE_2 may be a graphic card, a solid state drive (SSD), a volatile memory (e.g. a DRAM), etc.

Like the first storage device STORAGE_1, the second storage device STORAGE_2 may use the same virtual address system as the computing device 100. Hereinafter, this will be described in detail in FIG. 7.

The processor 130 may search for a plurality of second physical addresses corresponding to a plurality of second virtual addresses from the page table PG_TBL based on a second start virtual address that is a start address of a virtual address space including the plurality of second virtual addresses corresponding to a plurality of second pages for the second storage device STORAGE_2 respectively.

In this case, the plurality of second pages may be the above-described subpages. That is, unlike the case of the above-described first storage device STORAGE_1, the processor 13 may perform address translation on all subpages. Hereinafter, this will be described in detail in FIG. 8.

And the processor 130 may transmit a second access request for at least one second physical address among the plurality of searched second physical addresses to the second storage device STORAGE_2 through the second interface IF_2.

Figure 7:
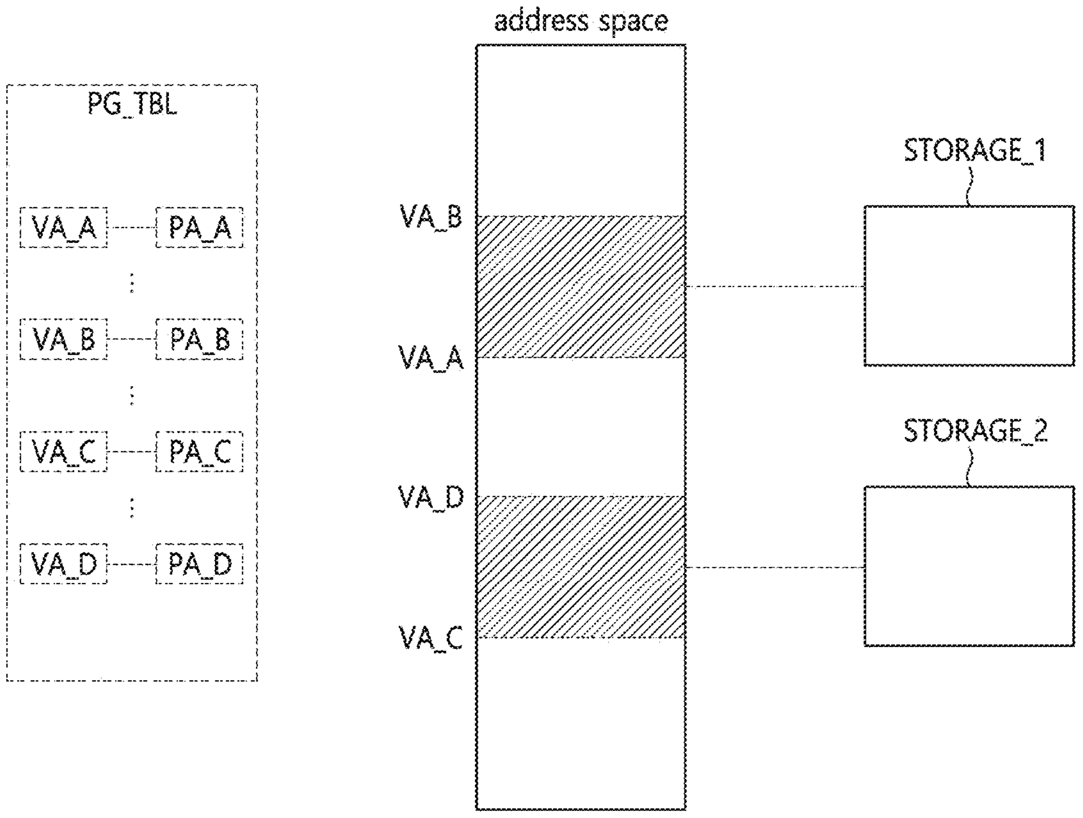
FIG. 7 is a diagram for describing an address space of a computing device according to an embodiment of the present disclosure.

FIG. 7 is a diagram for describing an address space of the computing device 100 according to an embodiment of the present disclosure.

Referring to FIG. 7, the same as the above-described FIG. 3, the virtual address space between the virtual address VA_A and the virtual address VA_B of the address space of the computing device 100 may be mapped to the first storage device STORAGE_1.

The virtual address space between the virtual address VA_C and the virtual address VA_D of the address space of the computing device 100 may be mapped to the second storage device STORAGE_2.

That is, to obtain the physical address of the first storage device STORAGE_1, the computing device 100 may search for a physical address mapped to a virtual address between the virtual address VA_A and the virtual address VA_B in the page table PG_TBL. To obtain the physical address of the second storage device STORAGE_2, the computing device 100 may search for a physical address mapped to a virtual address between the virtual address VA_C and the virtual address VA_D in the page table PG_TBL.

Figure 8:
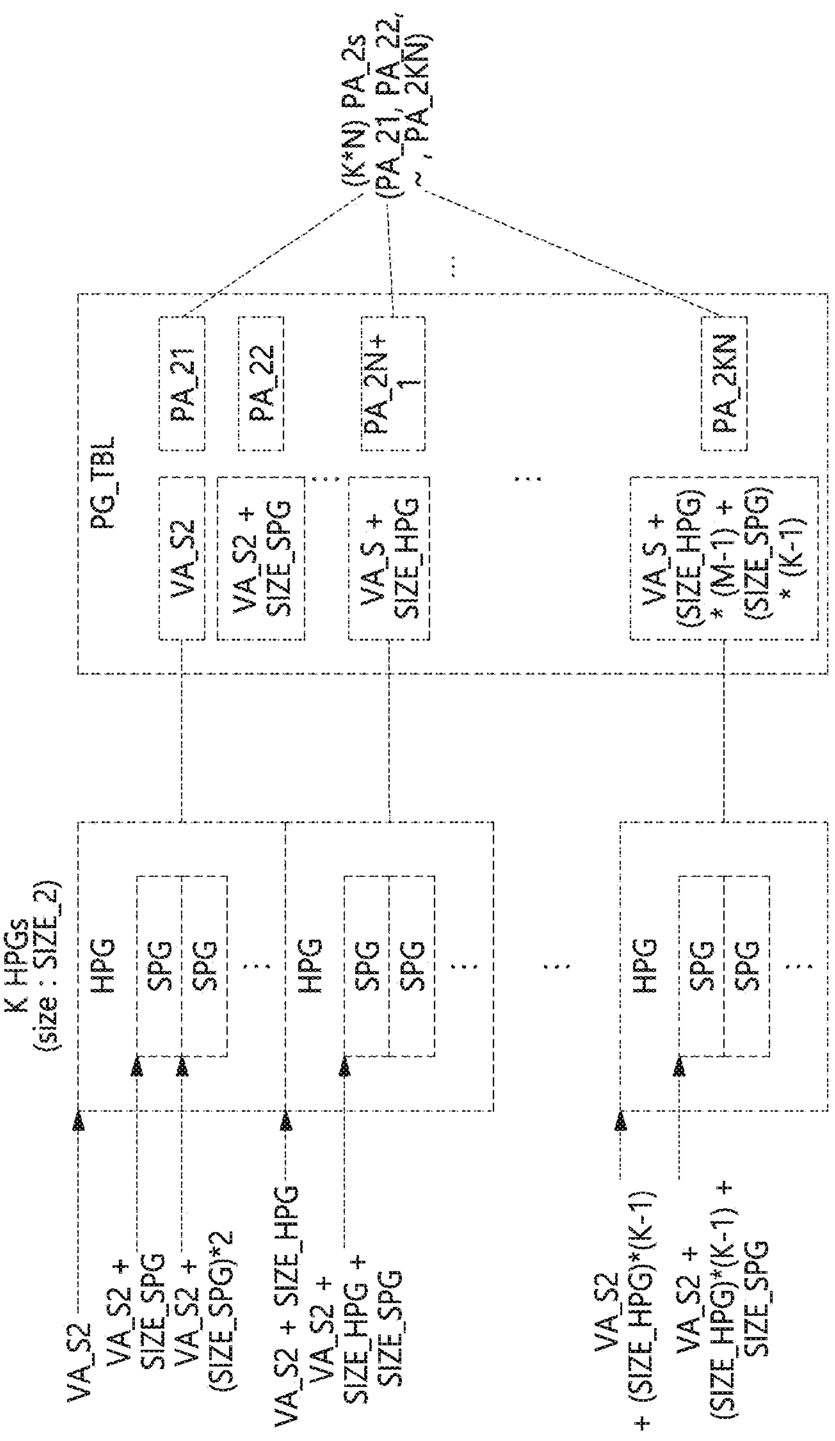
FIG. 8 is a diagram for describing an operation in which the computing device searches for a plurality of second physical addresses according to an embodiment of the present disclosure.

FIG. 8 is a diagram for describing an operation in which a computing device 100 searches for a plurality of second physical addresses PA_2*s* according to an embodiment of the present disclosure.

Referring to FIG. 8, about (K*N) second pages SPG included in K first pages HPG corresponding to the second storage device STORAGE_2, the processor 130 of the computing device 100 may search for (K*N) second physical addresses PA_2*s*, where K is a natural number of 2 or more, and the N is a natural number of 2 or more.

Given a second start virtual address VA_S2 which is a start virtual address of K first pages (that is, a start address of a virtual address space including a plurality of second virtual addresses corresponding to a plurality of second pages SPG respectively), the processor 130 may determine (K*N) second virtual addresses corresponding to all second pages SPG respectively. Since the size of each first page SIZE_HPG and the size of each second page SIZE_SPG are predetermined, the processor 130 may perform an operation to determine second virtual addresses corresponding to the (K*N) second pages SPG included in the K first pages HPG respectively based on this.

In FIG. 8, the (K*N) second virtual addresses corresponding to the (K*N) second pages SPG included in the K first pages HPG are VA_S2, VA_S2+SIZE_SPG, VA_S2+(SIZE_SPG)*2, ~, VA_S2+SIZE_HPG, VA_S2+SIZE_HPG+SIZE_SPG, ~, VA_S2+(SIZE_HPG)*(K−1), ~, VA_S2+(SIZE_HPG)*(K−1), VA_S2+(SIZE_HPG)*(K−1)+SIZE_SPG, ~.

The processor 130 may search for (K*N) second physical addresses corresponding to the determined (K*N) second virtual addresses respectively in the page table PG_TBL. The processor 130 may search for (K*N) second physical addresses PA_21, PA_22, ~, PA_2KN in the page table PG_TBL.

That is, in that the processor 130 performs address translation on all subpages SPG included in the K first pages HPG, it is different from address translation for the first storage device STORAGE_1 described in FIG. 4.

The processor 130 may store the above-described (K*N) second physical addresses PA_21, PA_22, ~, PA_2KN in a predetermined second data buffer (not shown). Like the first data buffer described above, the second data buffer may store a plurality of physical addresses. Like the first data buffer described above, the second data buffer may be included within the computing device 100 and may be located internally or externally to the processor 130.

Figure 9:
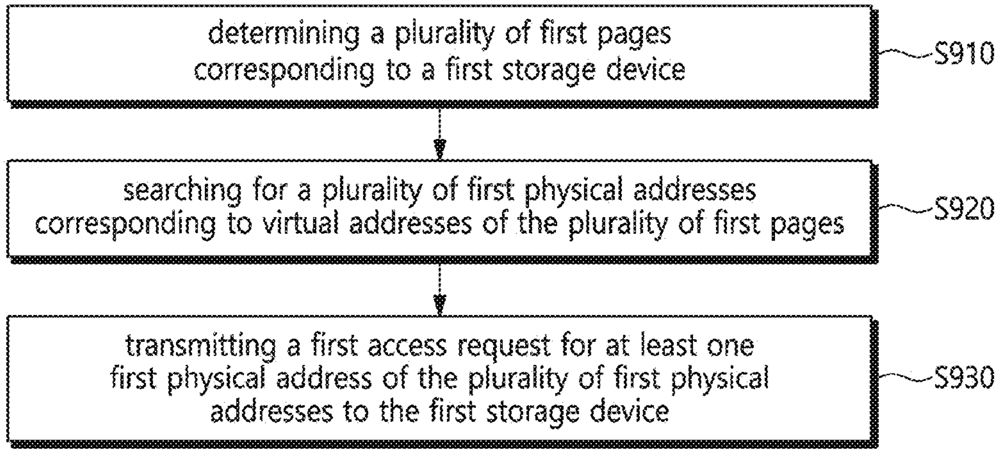
FIG. 9 is a flowchart for describing an operating method of the computing device according to an embodiment of the present disclosure.

FIG. 9 is a flowchart for describing an operating method of a computing device 100 according to an embodiment of the present disclosure.

Referring to FIG. 9, the operating method of the computing device 100 may include determining the plurality of first pages HPG corresponding to the first storage device STORAGE_1 (S910). In this case, the first storage device STORAGE_1 may be located external to the computing device 100, may use a virtual address system corresponding to the computing device 100, and may be separated into the plurality of first pages corresponding to the plurality of first virtual addresses respectively. Each of the plurality of first pages HPG may include a plurality of subpages.

And the operating method of the computing device 100 may include searching for the plurality of first physical addresses PA_1*s* that are start physical addresses corresponding to the plurality of first virtual addresses from the page table PG_TBL, which includes mapping information between the plurality of first virtual addresses and the physical address of the plurality of first pages corresponding to the plurality of first virtual addresses, based on the first start virtual address VA_S1 that is the start address of the virtual address space including the plurality of first virtual addresses corresponding to the plurality of first pages HPG (S920).

The operating method of the computing device 100 may include transmitting the first access request AR_1 for at least one first physical address of the plurality of first physical addresses PA_1*s* to the first storage device STORAGE_1 using the first interface IF_1 (S930).

For example, the first access request AR_1 may include at least one first physical address among the plurality of first physical addresses PA_1*s* and the size of the first page among the plurality of first pages HPG corresponding to the first access request AR_1.

The operating method of the computing device 100 may further include determining the plurality of second pages SPG corresponding to the second storage device STORAGE_2 internal to the second storage device STORAGE_2.

The operating method of the computing device 100 may further include searching for the plurality of second physical addresses PA_2*s* corresponding to the plurality of second virtual addresses from the page table PG_TBL based on the second start virtual address VA_S2 that is the start address of the virtual address space including the plurality of second virtual addresses corresponding to the plurality of second pages SPG for the second storage device STORAGE_2 respectively.

The operating method of the computing device 100 may further include transmitting the second access request for at least one second physical address of the plurality of second physical addresses PA_2*s* to the second storage device STORAGE_2 using the second interface IF_2.

Figure 10:
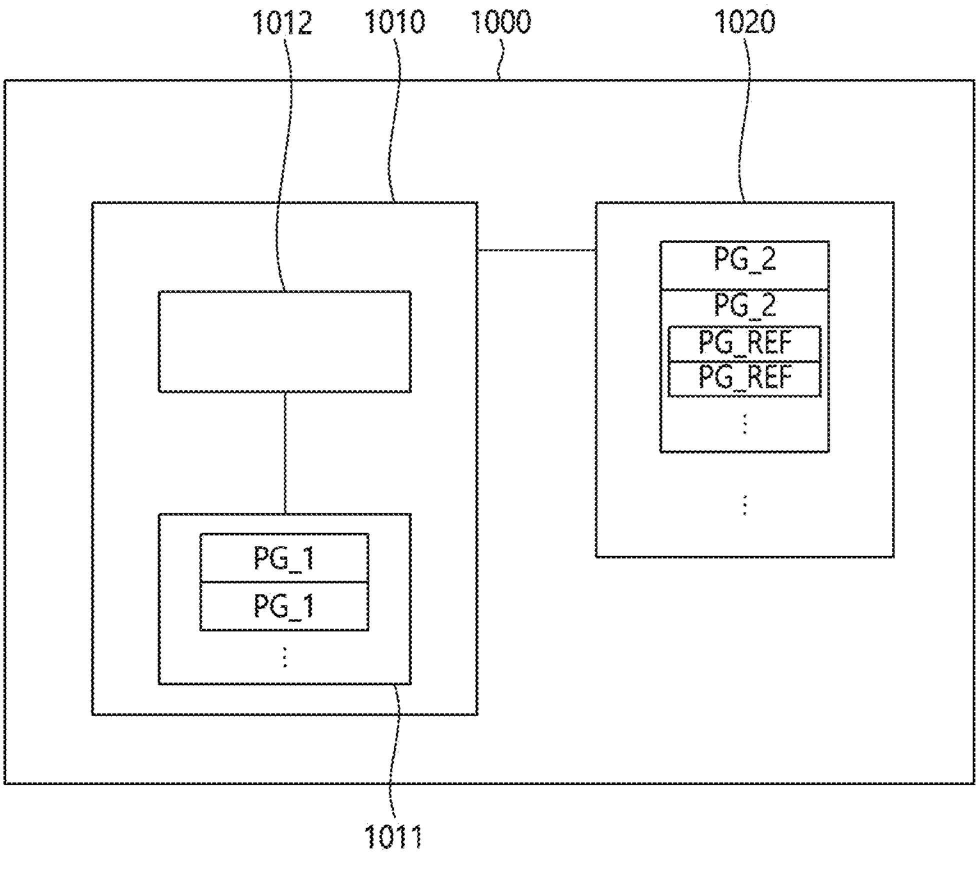
FIG. 10 is a diagram showing a configuration of a computing system according to an embodiment of the present disclosure.

FIG. 10 is a diagram showing a configuration of a computing system 1000 according to an embodiment of the present disclosure.

Referring to FIG. 10, the computing system 1000 may include a computing device 1010 and a second data storage device 1020. The computing device 1010 may be the computing device described in FIG. 1.

The computing device 1010 may include a first data storage device 1011 including a plurality of first storage pages PG_1 each having a first storage capacity and a processor 1012 controlling the first data storage device 1011. The processor 1012 may be the processor described in FIG. 1.

The second data storage device 1020 may be located outside the computing device 1010, and may include a plurality of reference pages PG_REF each having the first storage capacity and a plurality of second storage pages PG_2 each having a second storage capacity. The second storage capacity may be greater than the first storage capacity. The second data storage device 1020 may be the first storage device described in FIG. 1.

The processor 1020 may access a first storage page that requires access among the plurality of first storage pages PG_1 of the first data storage device 1011 based on a physical address corresponding to the first storage page that requires access.

The processor 1020 may access a second storage page that requires access among the plurality of second storage pages PG_2 of the second data storage device 1020 based on a physical address corresponding to a reference page with the highest physical address among the plurality of reference pages included in the second storage page that requires access.

The computing system 1000 may further include a data communication device (not shown) connecting the computing device 1010 and the second data storage device 1020. In this case, the data communication device may be separate from a data connection device connecting the processor 1012 and the first data storage device 1011.

For example, the data communication device may include a Compute eXpress Link (CXL) interface connecting the computing device 1010 and the second data storage device 1020.

The computing device 1010 may connect the processor 1012 and the first data storage device 1011 through the data connection device including a PCI Express (PCIe) interface or a system bus.

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A computing device comprising:

a first storage controller configured to communicate through a first interface with a first storage device which is located external to the computing device, uses a virtual address system corresponding to the computing device, and is separated into a plurality of first pages corresponding to a plurality of first virtual addresses respectively;

a memory configured to store a page table including mapping information between the plurality of first virtual addresses and physical addresses of the plurality of first pages corresponding to the plurality of first virtual addresses respectively;

a second storage device configured to use the virtual address system, and separated into a plurality of second pages corresponding to a plurality of second virtual addresses respectively;

a second storage controller configured to communicate with the second storage device through a second interface; and a processor configured to search for a plurality of first physical addresses, which are start physical addresses corresponding to the plurality of first virtual addresses, from the page table based on a first start virtual address, which is a start address of a virtual address space including the plurality of first virtual addresses corresponding to the plurality of first pages of the first storage device, control the first storage controller to transmit a first access request for at least one first physical address of the plurality of first physical addresses to the first storage device, search for a plurality of second physical addresses corresponding to the plurality of second virtual addresses, from the page table based on a second start virtual address, which is a start address of a virtual address space including the plurality of second virtual addresses corresponding to the plurality of second pages of the second storage device respectively; and control the second storage controller to transmit a second access request for at least one second physical address of the plurality of second physical addresses to the second storage device, wherein the processor does not search for the plurality of first physical addresses for subpages included in each of the plurality of first pages of the first storage device, and searches for the plurality of second physical addresses for all subpages included in each of the plurality of second pages of the second storage device.

2. The computing device according to claim 1, wherein the first storage controller is configured to communicate with the first storage device through the first interface including a Compute eXpress Link (CXL) interface.

3. The computing device according to claim 1, further comprising a first data buffer configured to store a plurality of physical addresses, wherein the processor is configured to store the plurality of searched first physical addresses in the first data buffer.

4. The computing device according to claim 1, wherein the processor is configured to include, in the first access request, at least one first physical address among the plurality of first physical addresses and a size of a first page among the plurality of first pages corresponding to the first access request.

5. The computing device according to claim 1, wherein the second storage controller is configured to communicate with the second storage device through the second interface including a PCI Express (PCIe) interface or a system bus inside the computing device.

6. The computing device according to claim 1, further comprising:

a second data buffer configured to store a plurality of physical addresses, wherein the processor is configured to store the plurality of searched second physical addresses in the first data buffer.

7. An operating method of a computing device, the operating method comprising:

determining a plurality of first pages corresponding to a first storage device which is located external to the computing device, uses a virtual address system corresponding to the computing device, and is separated into the plurality of first pages corresponding to a plurality of first virtual addresses respectively;

searching for a plurality of first physical addresses, which are start physical addresses corresponding to a plurality of first virtual addresses, from a page table, which includes mapping information between the plurality of first virtual addresses and the physical address of the plurality of first pages corresponding to the plurality of first virtual addresses, based on a first start virtual address, which is a start address of a virtual address space including the plurality of first virtual addresses corresponding to the plurality of first pages;

transmitting a first access request for at least one first physical address of the plurality of first physical addresses to the first storage device through a first interface;

determining a plurality of second pages corresponding to a second storage device using the virtual address system and separated into the plurality of second pages corresponding to a plurality of second virtual addresses respectively;

searching for a plurality of second physical addresses corresponding to the plurality of second virtual addresses from the page table based on a second start virtual address that is a start address of a virtual address space including the plurality of second virtual addresses corresponding to the plurality of second pages of the second storage device respectively; and transmitting a second access request for at least one second physical address of the plurality of second physical addresses to the second storage device using a second interface, wherein the searching for the plurality of first physical addresses comprises not searching for the plurality of first physical addresses for subpages included in each of the plurality of first pages of the first storage device, wherein the searching for the plurality of second physical addresses comprises searching for the plurality of second physical addresses for all subpages included in each of the plurality of second pages of the second storage device.

8. The method according to claim 7, wherein the first access request includes at least one first physical address among the plurality of first physical addresses and a size of a first page among the plurality of first pages corresponding to the first access request.

* * * * *